H. T. ROBBINS.
Improvement in Harness.
No. 132,413. Patented Oct. 22, 1872.
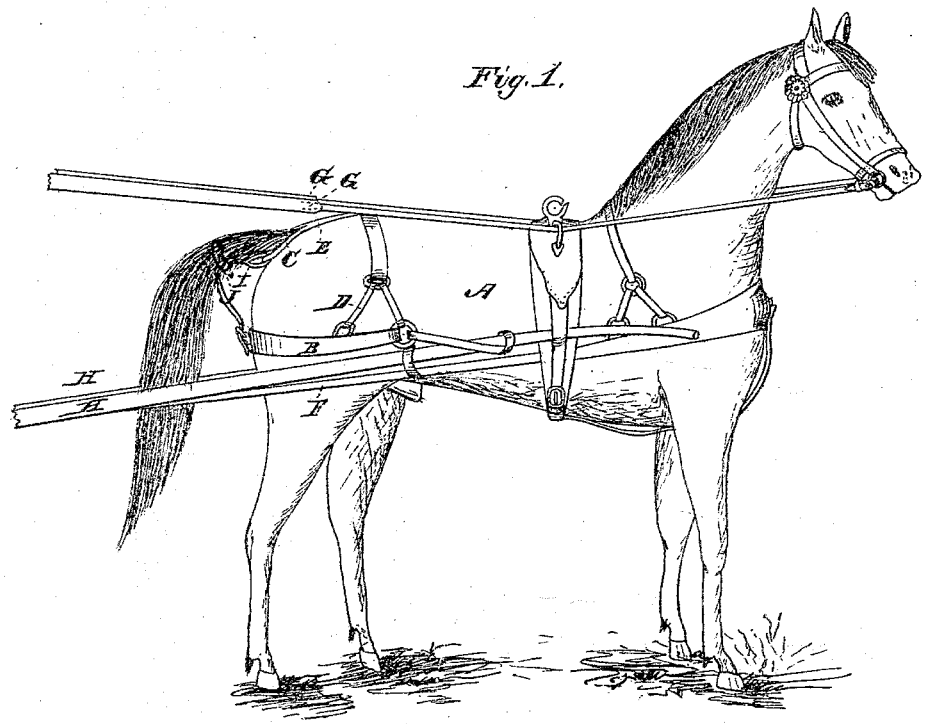
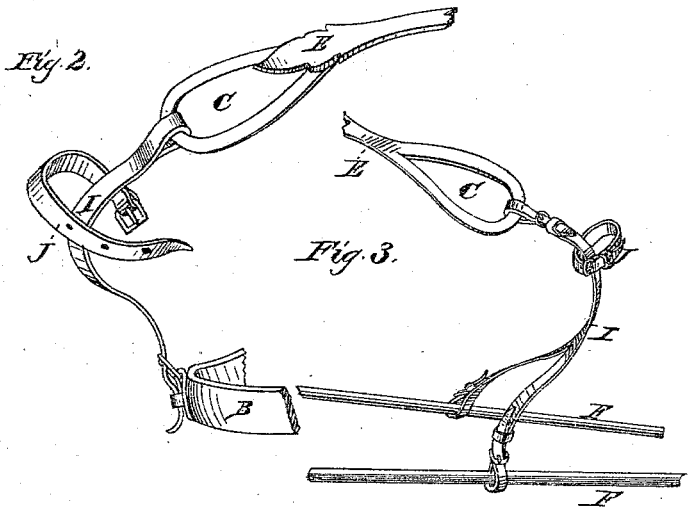
Attest.
A. E. Robbins
A. P. Robbins
Inventor.
Horace T. Robbins

UNITED STATES PATENT OFFICE.

HORACE T. ROBBINS, OF HYDE PARK, MASSACHUSETTS.

IMPROVEMENT IN HARNESS.

Specification forming part of Letters Patent No. 132,413, dated October 22, 1872.

*To all whom it may concern:*

Be it known that I, HORACE T. ROBBINS, of Hyde Park, in the county of Norfolk and State of Massachusetts, have invented a new and useful Improvement in Harness for Horses, of which the following is a specification:

My invention relates to the combination of straps with the ordinary harness, or with the harness and vehicle to which the horse is attached, in such a manner as to prevent the horse from throwing his tail over the reins, thereby preventing many accidents and entirely relieving the driver from the continued anxiety in regard to the position of his reins.

Figure 1 is a view of a horse having a harness with my improvement applied to it. Fig. 2 is an enlarged view of a part of the back-straps and crupper and a part of the breeching, together with my check device, detached from the horse. Fig. 3 is a view of the crupper and a part of the traces with my check device attached to them.

A is the horse; B, the breeching of the harness; C, the crupper; D, the hip-straps which support the breeching on each side of the horse; E, the back-strap which holds the hip-straps, and to which the crupper is attached; F are the traces; G, the reins; H, the shafts of the vehicle; I, the check-strap, the upper end of which is attached to the crupper and the lower end to the breeching B, as shown in Figs. 1 and 2. With harnesses which have no breeching I divide the check-straps, as shown in Fig. 3, and connect the lower ends to the traces F. J is a cross-strap connected to the check-strap I, and passing round the fleshy part of the horse's tail underneath (or outside) the hair to confine the tail to the check-strap. The upper end of the check-strap being attached to the crupper or some part of the harness above the cross-strap, prevents the cross-strap from working down on the horse's tail, and the lower end being attached to the breeching, traces, or some part of the vehicle, prevents him from throwing the fleshy part over the reins. The check-strap is of sufficient length below the cross-strap J to allow the horse a free use of his tail to brush the flies, but not long enough to pass the fleshy part over the reins, although they may lie quite low down on his sides.

I do not confine my invention to the precise arrangement above described, as the upper end of the check-strap may be substituted by passing a strap down to the cross-strap J from the back-strap on each side of the tail without connecting it to the crupper at all, and the lower end of the check-strap may be attached to the shafts H, or to the whiffletree; or a strap may be connected to the hip-straps on each side of the horse and carried over the tail without being connected to it; or it may pass under the tail and be connected to it. These in fact constitute the peculiar essence of my invention.

I therefore claim—

The cross-strap J, in combination with the check-strap I and the harness, substantially as and for the purpose hereinbefore set forth.

HORACE T. ROBBINS.

Witnesses:
JOSEPH SCOTT,
A. R. BROWN.